United States Patent Office 2,942,947
Patented June 28, 1960

2,942,947

PROCESS FOR THE PREPARATION OF PERCHLORYL FLUORIDE

Alfred Ferdinand Engelbrecht, Innsbruck, Austria, assignor to Pennsalt Chemicals Corporation, a corporation of Pennsylvania No Drawing. Filed Dec. 5, 1956, Ser. No. 626,319

10 Claims. (Cl. 23—203)

This invention relates to an improved method for the preparation of a fluorine derivative of perchloric acid. More particularly it relates to the preparation of perchloryl fluoride, $ClO_3F$.

Perchloryl fluoride is characterized by its heptavalent chlorine, $Cl^{+7}$. Its structural formula is

The compound is a colorless gas at ordinary temperatures. When liquefied, it boils at $-47.5°$ C. at 760 mm. pressure. On further cooling, it solidifies to a white crystalline solid at $-146°$ C. The gas has been found to be thermally stable at least up to $900°$ F. Gaseous perchloryl fluoride is readily liquefied and can be stored as a liquid for long periods of time.

Chemically, perchloryl fluoride is a strong oxidant. Perchloryl fluoride has potential value as an oxidizing agent in dye chemistry (for example, it oxidizes diphenylamine to form a dye), as a chemical cutter for steel, and as a component of an explosive for mining and construction work. Importantly, $ClO_3F$ possesses the advantages of having relatively low vapor pressures at ordinary temperatures (about 150 p.s.i. at $75°$ F.) and of being capable of prolonged storage as a liquid in ordinary steel cylinders without loss or deterioration.

The preparation of perchloryl fluoride involves the combination of fluorine and oxygen with chlorine in its highest state of oxidation. Perchloryl fluoride has been prepared by starting with a salt of an oxychloride in which the chlorine is at a lower level of oxidation and simultaneously oxidizing and metathesizing the salt with an oxidizing fluorinating agent, e.g., reacting potassium chlorate with elemental fluorine (H. Bode and E. Klesper, Z. Anorg. Allg. Chem. 266, 275–280, 1951).

Another method (A. Engelbrecht and H. Atzwanger, Mh. Chem. 83, 1087, 1952) is based on metathesis of a metal salt of an oxychloride in which chlorine is in its highest valence state with an acid fluoride under conditions of electrolysis, e.g., electrolysis of sodium perchlorate in anhydrous hydrofluoric acid.

The yield of perchloryl fluoride in each of the above methods is relatively low by commercial standards.

I have now invented a process whereby perchloryl fluoride can be made at significantly higher yields than are obtained by use of the above described methods. I have found that perchloryl fluoride can be made by reacting antimony pentafluoride with alkali metal and alkaline earth metal perchlorates and with aqueous perchloric acid. Yields of 50% and better are readily produced by my method.

This discovery is important in the light of the fact that prediction of a successful fluorinating agent for reaction with a perchlorate for formation of perchloryl fluoride is not possible, as evidenced by the finding that certain of the highly reactive common fluorinating agents do not readily form perchloryl fluoride, or form none at all, when they are reacted with a perchlorate. For example, fluorine, anhydrous hydrofluoric acid in the absence of electrolyzing conditions, antimony trifluoride and other fluorinating agents were found unsuccessful for this purpose.

The method of this invention, based on the metathesis of a metal oxychloride with a metal fluoride, is more efficient and economical than the methods of the literature, and gives higher yields of product at lower costs for raw materials and processing. Another advantage of my present process is that perchloryl fluoride is formed with a minimum amount of hazardous by-products.

Antimony pentafluoride, in addition to its function as a fluorinating agent in the reaction, also serves as a solvent for the reaction. This desirable effect becomes noticeable as the quantity of antimony pentafluoride in the reaction mass is increased. At higher dilutions of the perchlorate the yields of perchloryl fluoride are significantly better and the quantity of undesirable by-products is correspondingly decreased. The utilization of a dilute solution of a perchlorate in the antimony pentafluoride or other suitable solvents, i.e. materials not adversely reactive with the principal reactants or products, for example, fluorocarbon compounds, appear to create optimum conditions for the formation of perchloryl fluoride in high yields.

According to my invention perchloryl fluoride is produced by mixing and reacting a perchlorate, preferably potassium perchlorate, with antimony pentafluoride in a reactor and heating the reaction mass. Perchloryl fluoride is evolved from the reaction mass as a gas.

In a preferred embodiment of my invention a selected salt of perchloric acid is reacted with an excess of antimony pentafluoride with stirring at an elevated temperature. The evolved perchloryl fluoride is scrubbed to remove reaction by-products, e.g., chlorine or chlorine oxides, by passing the gases through a gas-washing solution. The perchloryl fluoride gas may be collected in a gas-holder from which it may be used directly, or from which it may be liquefied by compression or refrigeration, if desired. Unreacted antimony salt may be reconditioned for use by distillation.

In an advantageous procedure for practising my invention antimony pentafluoride is mixed with potassium perchlorate in the ratio of at least 3 moles, and preferably about 10 moles, of antimony pentafluoride to one mole of perchlorate. The mixture is placed in an acid-resistant reactor, stirred and heated gradually until reaction begins, around $70°$ C., and is then heated to a temperature up to $130°$ C., a temperature of from 100 to $120°$ C. being preferred. As the perchloryl fluoride gas forms, it is passed through a cold-water-cooled reflux condenser to strip out entrained antimony pentafluoride and easily condensible gases. The effluent gases are passed through aqueous scrubbing solutions. The scrubbing solutions may contain up to 25% caustic soda and up to 25% sodium thiosulfate, respectively. The perchloryl fluoride is substantially unaffected by the washing. The gas is liquefied by use of a cold-trap containing liquid oxygen or liquid nitrogen or a mixture of both, or by mechanical compression, the latter being preferred. The crude perchloryl fluoride may contain some oxygen. This latter gas can be removed by venting it from the liquefied perchloryl fluoride.

In pumping perchloryl fluoride the same precautions must be taken as with other strong oxidants to avoid contact of the perchloryl fluoride, under pressure or at moderately elevated temperatures, with easily oxidizable materials. The perchloryl fluoride is stored in cylinders and may be handled safely by using proper precautions.

Perchlorates can be reacted with antimony pentafluoride in most proportions to form some perchloryl fluoride. However, from the standpoint of optimum safety as well as of optimum yield it is preferred to use sufficient excess of antimony pentafluoride to dissolve the perchlorate. For potassium perchlorate this condition exists when the antimony pentafluoride is present in the ratio of about 23.4 parts by weight of the fluoride to 1 of potassium perchlorate. When more perchlorate is used than can be dissolved in the acid, vigorous stirring is required to avoid dormant masses of solid perchlorate which might react explosively with by-products formed in the primary reaction.

The perchlorate preferably used in the method of this invention is potassium perchlorate. Sodium, magnesium and barium perchlorates have also been used with good results. Other perchlorates also can be used to carry out the invention, including perchloric acid. The term "perchlorate" used in certain of the claims is intended to include perchloric acid. Relative costs and availabilities of various perchlorates favor the use of the potassium and sodium salts. Technical grade perchlorate has been found to work as well as material of higher purity. A low chlorate content is preferred in the perchlorate in order to minimize formation of undesirable by-products during the reaction with the fluorinating agent.

The antimony pentafluoride used in the practice of this invention is commercially available, or may be prepared by treating antimony trifluoride or oxide with fluorine; it may also be obtained by the reaction between antimony pentachloride and anhydrous hydrogen fluoride. The technical grade of antimony pentafluoride, containing less than 100% $SbF_5$, has been found satisfactory for use.

In carrying out the reaction of this invention the preferred temperature range is 70 to 130° C. The temperature may be raised to the boiling point of the antimony pentafluoride, which at atmospheric pressure is about 149.5° C.; however, since by raising the temperature the possibility of undesirable side reactions is increased, a lower temperature, around 100° C., is preferred. Below 70° C. the reaction proceeds too slowly for practical purposes. Addition of heat is desirable to maintain the rate of the reaction.

The scrubbing solutions used in the gas scrubbers are useful to remove chlorine and reactive gases other than perchloryl fluoride which may be formed. The solutions may be water or may contain up to 25% of an alkali and up to 25% of a reducing agent, preferably some of each. Although aqueous scrubbing solutions are preferred, dry contacting agents may also be used in removing by-product gases from the perchloryl fluoride gas stream. Sodium hydroxide is preferred as the alkali and sodium thiosulfate as the reducing agent. Other neutralizing and reducing agents may also be used for this purpose.

In mixing the reactants in carrying out my process it is preferred to add the perchlorate to the antimony pentafluoride. The perchlorate is preferably used as a small-sized particle which will readily go into solution in the antimony pentafluoride. Complete solution of the perchlorate is desirable but not necessary. Mixing is preferably done at room temperatures to carry out the solution step. Mixing is also necessary while carrying out the reaction if the perchlorate is present in excess of its solubility limit in the antimony pentafluoride.

The invention may be practiced as a batchwise or as a continuous operation. It may be carried out in conventional type vessels, for example, common corrosion-resistant kettle reactors. The reactor vessel may be used in combination with continuous feeders for the ingredients and with a continuous distillation unit for recovery of the unreacted antimony pentafluoride for reuse in the reaction.

The perchloryl fluoride can be stored in a water-sealed gas-holder and used directly from it. The gas can be liquefied by compression into ordinary steel vessels of suitable strength.

The time required to carry out the reaction between the perchlorate and the antimony pentafluoride is dependent on the temperature at which the operation is carried out. In a conventional batch-type reactor the reaction can be completed within reaction periods ranging from about 2 to 24 hours. A period of 4 hours is preferred for a charge of 1 part by weight of perchlorate to about 24 parts of antimony pentafluoride in a temperature range of 100–130° C.

The invention and its practice are further illustrated by the following examples, in which the parts are by weight.

*Example 1*

Potassium perchlorate was reacted with antimony pentafluoride in a mole ratio of $KClO_4:SbF_5$ of 1:3.

47 parts of antimony pentafluoride were placed in a glass reactor. 10 parts of crystalline potassium perchlorate were added gradually to the antimony pentafluoride with moderate agitation. The reactor was equipped with a thermometer well extending into the reaction mixture, a nitrogen purging inlet, a mechanical stirrer, and a water-cooled reflux condenser. A take-off tube was attached to the top of the condenser to lead the effluent gases to a series of four gas-scrubbers each half-filled with an aqueous solution containing about 10% caustic soda and about 5% sodium thiosulfate. The gas inlet to the first scrubber was arranged so that the gases passed over and not into the scrubbing solution in the reactor. The outlet led to the other scrubbers in the series, which were fitted so that the gases passed through the solution in each scrubber. A drying tube containing solid potassium hydroxide led the gases from the last scrubber to a liquid-nitrogen-cooled trap into which the product was condensed. The reactor was heated rapidly at first to 70° C. and then slowly to 100° C. The reaction temperature was held at 100–120° C. by applying heat. The flow of water through the reflux condenser was held so that the temperature of the effluent water from the condenser was around 25° C. Evolution of perchloryl fluoride began to be noticeable at 70° C. and was vigorous at 100° C. The reaction rate was readily controlled by decreasing or increasing the heat to the reactor. The condenser served to reflux antimony pentafluoride back to the reactor. Reaction was complete in about 4 hours. A liquid residue composed mostly of antimony pentafluoride with some complex potassium antimony oxyfluoride salts remained in the reactor. The reactor system was purged with nitrogen gas before dismantling it. 3.1 parts of perchloryl fluoride were recovered in the liquid nitrogen trap. The yield of perchloryl fluoride was 42% based on the amount of potassium perchlorate charged. The perchloryl fluoride boiled at −47.5° C. Its identity was confirmed by infra-red analysis. Its purity was determined by chemical and gas chromatographic analysis to be about 98.5%, the difference from 100 in the analysis being due to the presence of air and carbon dioxide.

*Example 2*

Potassium perchlorate was reacted with antimony pentafluoride in a mole ratio of $KClO_4:SbF_5$ of 1:10.

156 parts of antimony pentafluoride were reacted with 10 parts of potassium perchlorate as in Example 1. A yield of 53% of $ClO_3F$ was obtained based on the weight of $KClO_4$ charged.

*Example 3*

Potassium perchlorate was reacted with antimony pentafluoride in a mole ratio of $KClO_4:SbF_5$ of 2:1. The apparatus and procedure described in Example 1 were used. A yield of about 13% of $ClO_3F$ was obtained based on the weight of $KClO_4$ charged. The product before scrubbing was observed to contain several percent of chlorine heptoxide, $Cl_2O_7$, an undesirable and hazardous compound.

*Example 4*

Potassium perchlorate was reacted with antimony pentafluoride at sub-atmospheric pressure in a mole ratio of $KClO_4:SbF_5$ of 1:3.68.

57.5 parts of antimony pentafluoride and 10 parts of potassium perchlorate were mixed in a reactor which thereupon was evacuated to about 1 cm. mercury pressure. Formation of $ClO_3F$ began at once at room temperature. A yield of 9% of $ClO_3F$, based on $KClO_4$ charged, was obtained in four hours. The reaction mass was then heated in the range 90–120° C. and an additional yield of 36% of $ClO_3F$ was obtained, making a total of 45%.

*Example 5*

Sodium perchlorate monohydrate was reacted with antimony pentafluoride in a mole ratio of $$NaClO_4 \cdot H_2O:SbF_5$$

of 1:3.

47 parts of antimony pentafluoride were reacted with 10 parts of sodium perchlorate monohydrate using the apparatus of Example 1, except that the reaction temperature range was held at 125–130° C. A yield of 9% of $ClO_3F$ was obtained based on the weight of $NaClO_4 \cdot H_2O$ charged.

*Example 6*

Aqueous, 60–62%, perchloric acid was reacted with a large excess of antimony pentafluoride by slowly adding the perchloric acid to the pentafluoride at a temperature range of 90–100° C. A yield of 36% of $ClO_3F$ was obtained based on weight of perchloric acid (100% basis) charged.

*Example 7*

Barium perchlorate was added to and reacted with antimony pentafluoride in a mole ratio of $Ba(ClO_3)_2:SbF_5$ of 1:2 at a temperature of about 120° C. A yield of 9% of $ClO_3F$ was obtained based on weight of $Ba(ClO_4)_2$ charged.

*Example 8*

Hydrated magnesium perchlorate was mixed and heated to 120° C. with antimony pentafluoride in the ratio $$Mg(ClO_4)_2 \cdot 3H_2O:SbF_5$$

of 1:4. A yield of 5% of $ClO_3F$, based on weight of $Mg(ClO_4)_2$ charged, was obtained.

Following procedures substantially as described in the above examples antimony pentafluoride may also be reacted with other perchlorates, e.g. lithium, calcium, nitrosyl, silver, and so on, to produce perchloryl fluoride.

Many widely different embodiments of this invention may be made and many process variables obvious to those skilled in the art may be introduced without departing from the scope and spirit thereof and it is to be understood that my invention includes all such embodiments and is not to be limited by the above description.

I claim:

1. A process for the preparation of an inorganic fluorine derivative of perchloric acid which comprises reacting an inorganic perchlorate with antimony pentafluoride.

2. A process for the preparation of perchloryl fluoride which comprises reacting an inorganic perchlorate with an excess of antimony pentafluoride at a temperature in the range from 70° C. to about the boiling point of the mixture.

3. A process for the preparation of perchloryl fluoride which comprises reacting a substance having a perchlorate radical selected from the group consisting of hydrogen, potassium, sodium, barium and magnesium perchlorates with an excess of antimony pentafluoride at a temperature in the range from about 70° C. to about the boiling point of the mixture.

4. A process for the preparation of perchloryl fluoride which comprises reacting aqueous perchloric acid with an excess of antimony pentafluoride at a temperature in the range from about 70° C. to about the boiling point of the mixture.

5. A process for the preparation of perchloryl fluoride which comprises reacting potassium perchlorate with an excess of antimony pentafluoride at a temperature in the range from about 70° C. to about the boiling point of the mixture.

6. A process for the preparation of perchloryl fluoride which comprises reacting potassium perchlorate with antimony pentafluoride in the ratio of at least 0.5 moles of antimony pentafluoride per mole of potassium perchlorate at a temperature in the range from about 70° C. to about 130° C.

7. A process for the preparation of perchloryl fluoride which comprises reacting potassium perchlorate with antimony pentafluoride in the ratio of from about 3 to about 10 moles of antimony pentafluoride per mole of potassium perchlorate at a temperature in the range from 70° C. to about 130° C.

8. A process according to claim 3 in which the perchlorate is sodium perchlorate.

9. A process according to claim 3 in which the perchlorate is barium perchlorate monohydrate.

10. A process according to claim 3 in which the perchlorate is hydrated magnesium perchlorate.

References Cited in the file of this patent

Mellor: "Comprehensive Treatise on Inorganic and Theoretical Chemistry," vol. 9, pp. 467–468.

Jour. of Inorganic and Nuclear Chemistry (April 1956) p. 266.